(12) United States Patent
Tracy et al.

(10) Patent No.: US 8,317,128 B2
(45) Date of Patent: Nov. 27, 2012

(54) LAMINAR FLOW WING OPTIMIZED FOR TRANSONIC CRUISE AIRCRAFT

(75) Inventors: Richard R. Tracy, Washoe Valley, NV (US); James D. Chase, Reno, NV (US)

(73) Assignee: Aerion Corporation, Reno, NV (US)

(*) Notice: Subject to any disclaimer, the term of this patent is extended or adjusted under 35 U.S.C. 154(b) by 82 days.

(21) Appl. No.: 12/932,091

(22) Filed: Feb. 16, 2011

(65) Prior Publication Data

US 2012/0043430 A1 Feb. 23, 2012

Related U.S. Application Data

(63) Continuation-in-part of application No. 12/589,424, filed on Oct. 26, 2009.

(51) Int. Cl.
*B64C 3/14* (2006.01)
(52) U.S. Cl. ...................................... 244/35 R
(58) Field of Classification Search ............... 244/35 R, 244/35 A, 36, 198, 204, 45 R
See application file for complete search history.

(56) References Cited

U.S. PATENT DOCUMENTS

| | | | | |
|---|---|---|---|---|
| 2,709,052 A | * | 5/1955 | Berg | 244/35 R |
| 4,611,773 A | * | 9/1986 | Goldhammer et al. | 244/35 R |
| 4,834,617 A | * | 5/1989 | Wainauski et al. | 416/242 |
| 5,322,242 A | * | 6/1994 | Tracy | 244/36 |
| 5,518,204 A | * | 5/1996 | Tracy | 244/36 |
| 5,897,076 A | * | 4/1999 | Tracy | 244/117 A |
| 6,149,101 A | * | 11/2000 | Tracy | 244/130 |
| 7,000,870 B2 | * | 2/2006 | Tracy et al. | 244/130 |

FOREIGN PATENT DOCUMENTS

JP 1-141199 6/1989

OTHER PUBLICATIONS

Peter Sturdza, Valerie M. Manning, Ilan M. Kroo, Richard R. Tracy, "Boundary Layer Calculations Preliminary Design of Wings in Supersonic Flow", American Institute of Aeronautics and Astronautics, pp. 1-11, USA.

* cited by examiner

*Primary Examiner* — Tien Dinh
*Assistant Examiner* — Keith L Dixon
(74) *Attorney, Agent, or Firm* — William W. Haefliger

(57) ABSTRACT

On an aircraft designed for maximum efficient cruise speed in the range from about Mach 0.8 to about Mach 1.2, and having fuselage and wings with: (a) less than about 25 degrees of leading edge sweep, in combination with airfoil thickness to chord ratios between about 3% and about 8%, as an average along the wing semi-span outboard from the zone of substantial fuselage influence, and (b) wing leading edge sweep between about 20 degrees and about 35 degrees, in combination with airfoil thickness to chord ratios equal to or below about 3% as an average along the semi-span outboard from the zone of substantial fuselage influence to the wing tip.

15 Claims, 7 Drawing Sheets

LAMINAR FLOW WING OPTIMIZED FOR TRANSONIC CRUISE AIRCRAFT

This is a continuation in part of our prior application, LAMINAR FLOW WING OPTIMIZED FOR SUPERSONIC CRUISE AIRCRAFT Ser. No. 12/589,424, filed Oct. 26, 2009.

This invention relates generally to the configuration of transonic aircraft with wings designed for extensive natural laminar flow (NLF), and more particularly to optimization of wing thickness, sweep and fuselage cross section relationship criteria, for such transonic aircraft.

BACKGROUND OF THE INVENTION

Transonic NLF wing aircraft configurations as described herein are desirable for efficient transonic cruise, e.g. high subsonic speeds typically above about Mach 0.80 and up to slightly above Mach 1. Principal features of the herein described configurations are low to moderate sweep, sharp or slightly blunted leading edge, and relatively thin airfoils in terms of the ratio of maximum airfoil thickness to chord (t/c). The importance of the NLF boundary layer (BL) in terms of drag reduction can be understood by considering that for typical transonic cruise flight conditions the laminar skin friction drag is approximately 10% of the turbulent skin friction drag associated with a traditional swept wing designs, for the same amount of surface area. Additionally, the transonic NLF wing configurations described herein can achieve best cruise efficiency at higher Mach numbers than possible with the swept wings typically used on high speed subsonic cruise aircraft.

For extensive NLF, the wing must have low or moderate sweep, and thus, on a purely aerodynamic basis the low sweep NLF wing should be relatively thin to limit the volume wave drag at the design cruise Mach number. On the other hand a thinner wing incurs a weight penalty, since structural weight varies inversely with wing thickness, everything else being equal, so that selection of thickness to chord ratio (t/c) is of substantial importance to optimizing the performance of such aircraft.

In previous studies, the NLF wing was designed to give best efficiency at speeds of about Mach 0.95 or higher. This work formed certain bases for U.S. Pat. No. 7,000,870, "LAMINAR FLOW WING FOR TRANSONIC CRUISE", incorporated herein by reference. This Mach number criterion led to the provision of about 3% (0.03) as an upper limit for the span-wise average t/c ratio of the NLF wing and leading edge sweep angles of less than about 20.

However, that prior patent specified no variation of t/c with design cruise Mach number, M. Design studies have been extended to cover a range of cruise Mach numbers down to about Mach 0.80, near the maximum efficient cruise Mach number of previous subsonic aircraft with low wing sweep designed for long range. These studies showed that low or moderately swept NLF wings having average t/c up to about 0.08 (8%) would fill a gap in efficient cruise Mach number between about 0.80 and about Mach 0.95. Such wings can be designed for extensive NLF by methods described in our prior patents and the patent application referenced above (Ser. No. 12/589,424) of which this is a continuation in part.

In addition, certain design combinations of wing sweep and t/c, can enable efficient cruise Mach numbers up to about 1.05, well beyond the maximum efficient cruise Mach number of high speed, long range aircraft other than supersonic designs capable of operating at more than about Mach 1.2. Such wings were found to require average t/c ratios of about 0.03 (3%) or less, and for some missions could benefit from greater leading edge sweep than the previous limit of about 20 degrees specified in our U.S. Pat. No. 7,000,870. For example a sweep of about 30 degrees is required for an efficient cruise Mach number of 0.99 with an average t/c ratio of about 0.03 (3%). Achieving extensive NLF for such wing sweep is more difficult and some loss in LF coverage extent is inevitable.

We have found the foregoing combinations of thickness and sweep to be advantageous for efficient flight at transonic speeds and determined that these combinations have not been used or disclosed previously. For example there are many subsonic aircraft which are limited to maximum cruise speeds of less than Mach 0.80, and which utilize low sweep, but have thicker wings than the herein proposed t/c upper limit of 8%. On the other hand there are aircraft such as commercial jet airliners and high speed business jets, which are designed for efficient cruise speeds above Mach 0.8 but which have much higher than 25 degrees of wing sweep, or t/c greater than 8%. Finally there are actual and proposed supersonic aircraft such as "Concorde", designed for cruise speeds well above Mach 1.2, which feature t/c below 3%, but use very high leading edge sweep greater than about 50 degrees.

As previously noted in prior application (Ser. No. 12/589,424) titled, LAMINAR FLOW WING OPTIMIZED FOR SUPERSONIC CRUISE AIRCRAFT, a number of considerations may drive the optimal thickness to higher values, even at the expense of a moderate increase in volume wave drag for a given design Mach number. For example the favorable pressure gradient, which stabilizes the laminar boundary layer, increases with t/c ratio, and as noted, structural weight decreases with increasing thickness. In addition, the volume wave drag attributable to the wing can be reduced by contouring the fuselage in the vicinity of the wing. Finally, the achievement of NLF on large areas of the wing surface is dependent on (a) achieving appropriate pressure gradients over the affected surfaces of the wing and (b) suitable leading edge size and shape. These pressure gradients depend not only on the local airfoil shapes, but also are influenced by the fuselage contour or contours adjacent to the wing.

There is, accordingly, a need for improvements in cruise efficiency and range of transonic aircraft, and particularly in the optimization of the airfoil shapes, thickness to chord ratios, wing sweep and aspect ratio, as well as the fuselage contours affecting both volume wave drag and NLF extent over the wing surfaces. Similar considerations can be applied to the design of horizontal and vertical tail surfaces.

SUMMARY OF THE INVENTION

The present invention extends the use of wing configurations for aircraft designed for efficient cruise at transonic speed, described in prior U.S. Pat. No. 7,000,870, "LAMINAR FLOW WING FOR TRANSONIC CRUISE" and in patent application Ser. No. 12/589,424, LAMINAR FLOW WING OPTIMIZED FOR SUPERSONIC CRUISE AIRCRAFT, of which this is a continuation in part, to aircraft designed for maximum operating Mach number (Mmo) of greater than about 0.80 up to about Mach 1.2, as follows: (a) wings having less than about 25 degrees leading edge sweep, in combination with increased average thickness to chord ratios from about 3% up to about 8% as an average along the wing span outboard of the zone of fuselage influence, and (b) having more than about 20 degrees leading edge sweep up to about 35 degrees, in combination with thickness to chord ratios less than about 3% as an average along the wing span outboard of the zone of fuselage influence.

The wing thickness to chord ratios may typically vary from outboard of the zone of substantial fuselage influence to the wing tip, such that the average of such ratio along such portion of the span is consistent with the criteria stated in the foregoing. Wing sweep refers to the leading edge of the basic "trapezoidal wing", or to the minimum leading edge sweep in other cases such as the "ogive" wing plan or wings with an inboard strake. The invention includes all airfoil types such as bi-convex, NACA 6-series and supercritical, appropriately modified to provide, at design cruise Mach number and lift coefficient, an optimal combination of (a) extensive laminar flow over upper, lower, or both surfaces, (b) low wave drag, and also (c) high lift at low speed.

The fuselage is preferably contoured to reduce or minimize wave drag of the wing-fuselage combination, including engine nacelles and empennage. The foregoing principals generally apply to tail surfaces as well. Such wing and fuselage contours to achieve optimal mission performance can be accomplished by either (a) an iterative process combining configuration design experience, aerodynamic analysis and wind tunnel testing, or (b) a computer-based multi-disciplinary optimization method combined with configuration design constraints. The foregoing design processes also would preferably include propulsion nacelles and tail or other lifting or control surfaces such as canards. The shaping optimization also would preferably include the effect of the distribution of t/c on wing weight and thus on range at a given overall maximum weight or maximum weight for a given range.

DRAWING DESCRIPTION

FIG. 1 shows such an aircraft in plan view, as well as a cross section of the wing showing a typical airfoil in FIG. 1a.

DETAIL DESCRIPTION

Figure 1:
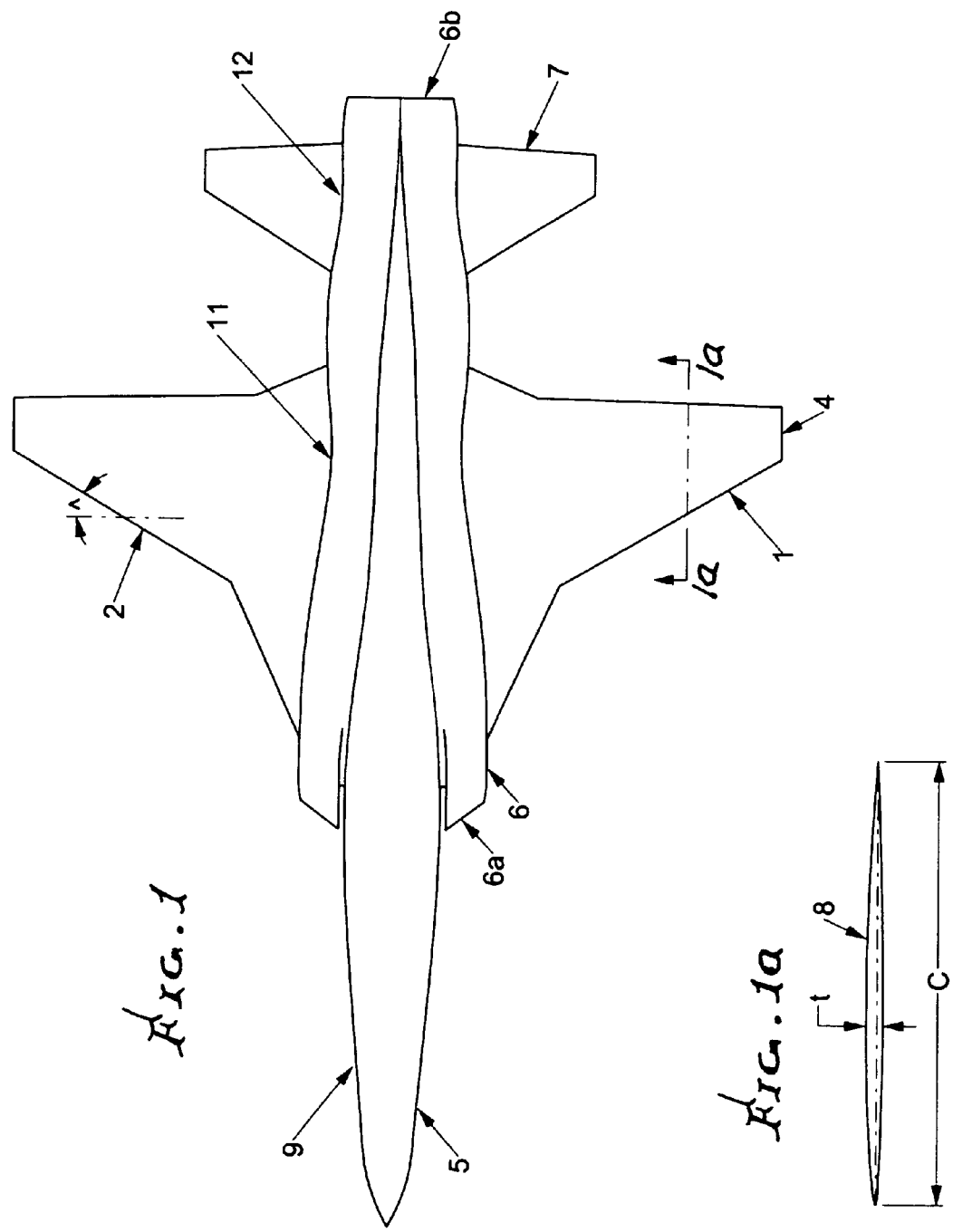

FIG. 1 shows an aircraft 9 incorporating the invention including a fuselage 5, a jet engine nacelle 6 including inlet and exhaust ends 6a and 6b, tail 7 and wing 1. An integrated fuselage/nacelle is illustrated, but the invention applies also to aircraft with separate engine nacelles mounted on the wing or fuselage.

The wing leading edge sweep angle ˆ is defined as the minimum angle of the outboard trapezoidal wing leading edge 2 relative to a line projected normally outboard from the aircraft longitudinal axis. FIG. 1a is a chordwise vertical section A-A through the wing 8, and is generally representative of the wing t/c ratio, where these dimensions are shown in section A-A. For the present purposes, the wing t/c is defined as the average of the t/c values along the wing span from a location outboard of the zone of appreciable fuselage influence on wing drag to the wing tip 4.

Location 11 shows a reduction in cross-sectional area of the fuselage and/or nacelle adjacent to wing 1 to reduce wave drag in accordance with area rule principals, as well as to reduce viscous drag by suppressing cross-flow pressure gradients across the wing surface, which are generally adverse to laminar flow. Location 12 shows a similar modification of fuselage cross-sectional area adjacent to tail 7.

Figure 2:
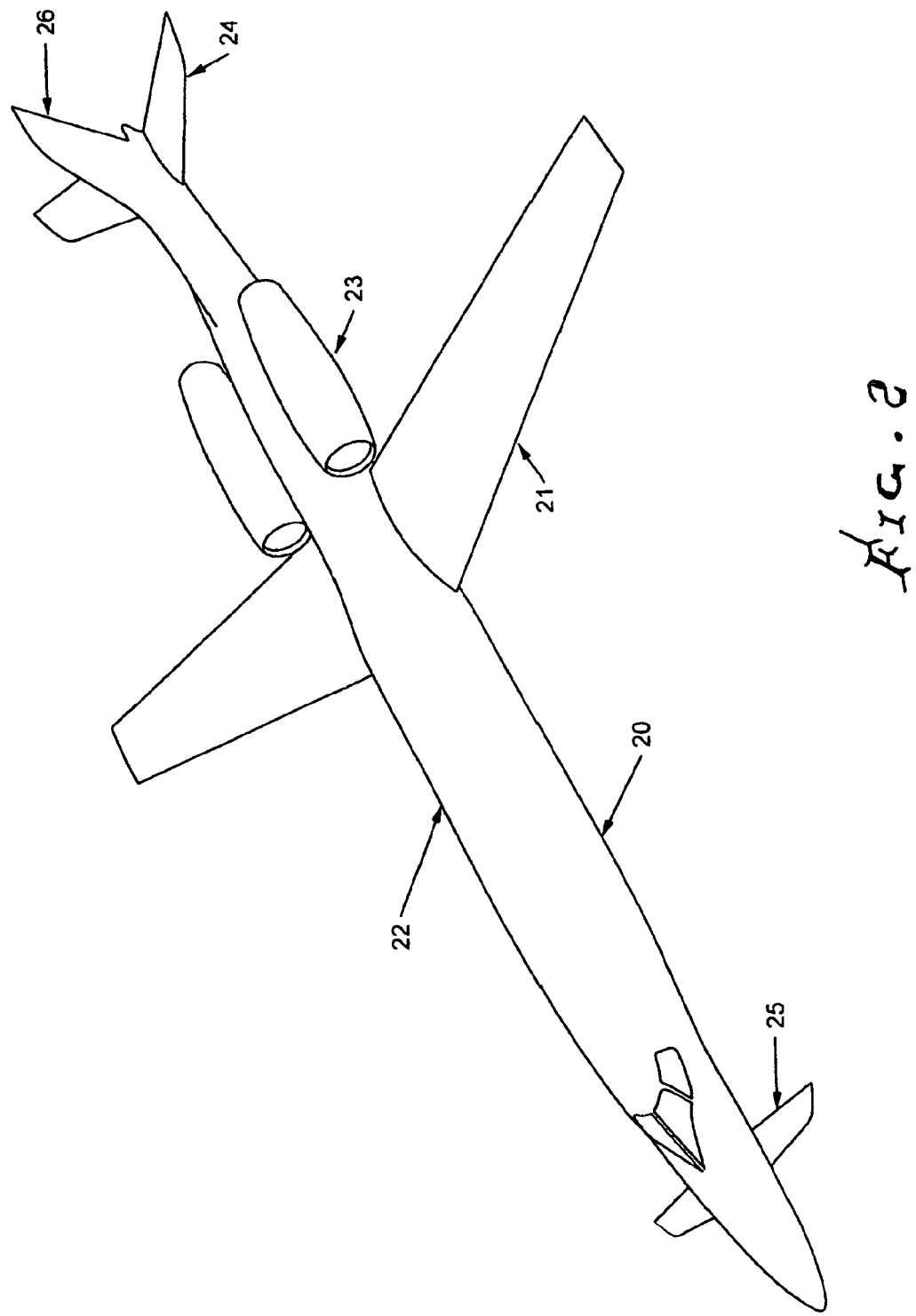
FIG. 2 shows a representative transonic aircraft configuration.

FIG. 2 shows an alternative preferred aircraft configuration 20 incorporating the invention, featuring a fuselage body 22, engine nacelle 23, wing 21, aft located horizontal tail surface 24, aft located vertical tail surface 26, and forwardly located canard surface 25. Any or all of the wing and stabilizing or control surfaces 21, 24, 25, 26 may incorporate leading edge sweep and thickness geometries as described previously. The fuselage 22 and/or nacelle 23 may have reduced cross-section or "waisting" adjacent to surfaces 21, 24, 25, or 26 to reduce drag as described above.

Figure 3:
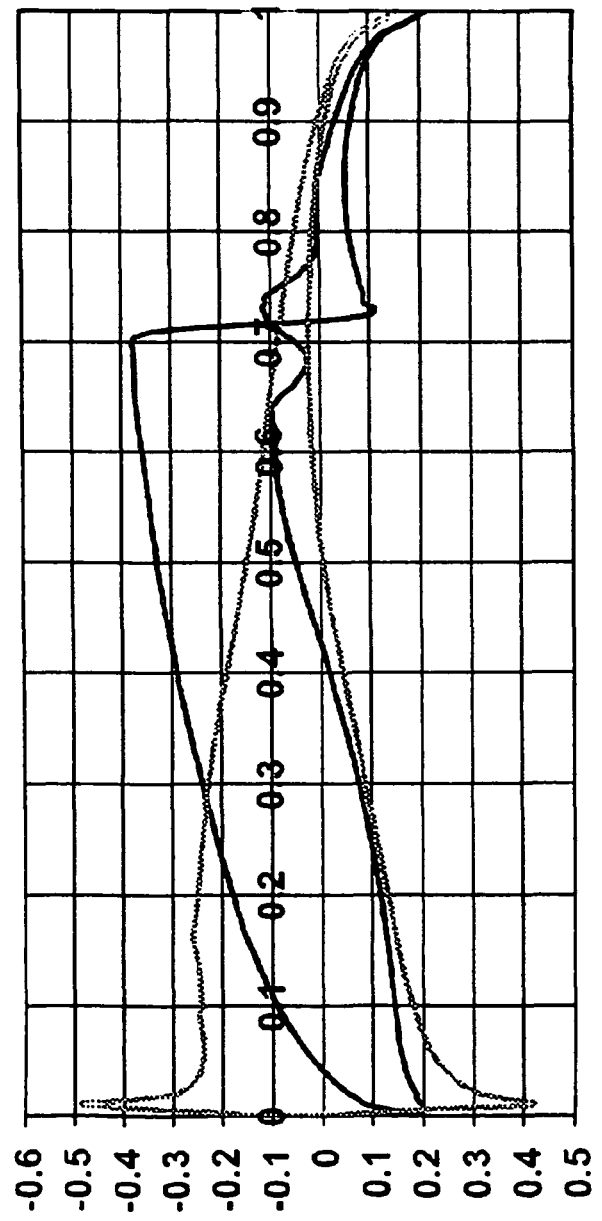
FIG. 3 is a graph of the pressures on the upper and lower surfaces of an airfoil at two Mach numbers.

FIG. 3 illustrates the pressures on the upper and lower surfaces of an airfoil at two Mach numbers. It shows the effect of higher subsonic Mach number in creating pressure conditions favorable to laminar flow, namely the negative pressure gradients (pressure decreasing with distance aft) over the majority of both upper and lower surfaces at Mach 0.95. For comparison the positive pressure gradients at Mach 0.8, especially on the upper surface, are adverse to extensive runs of laminar flow.

Figure 4:
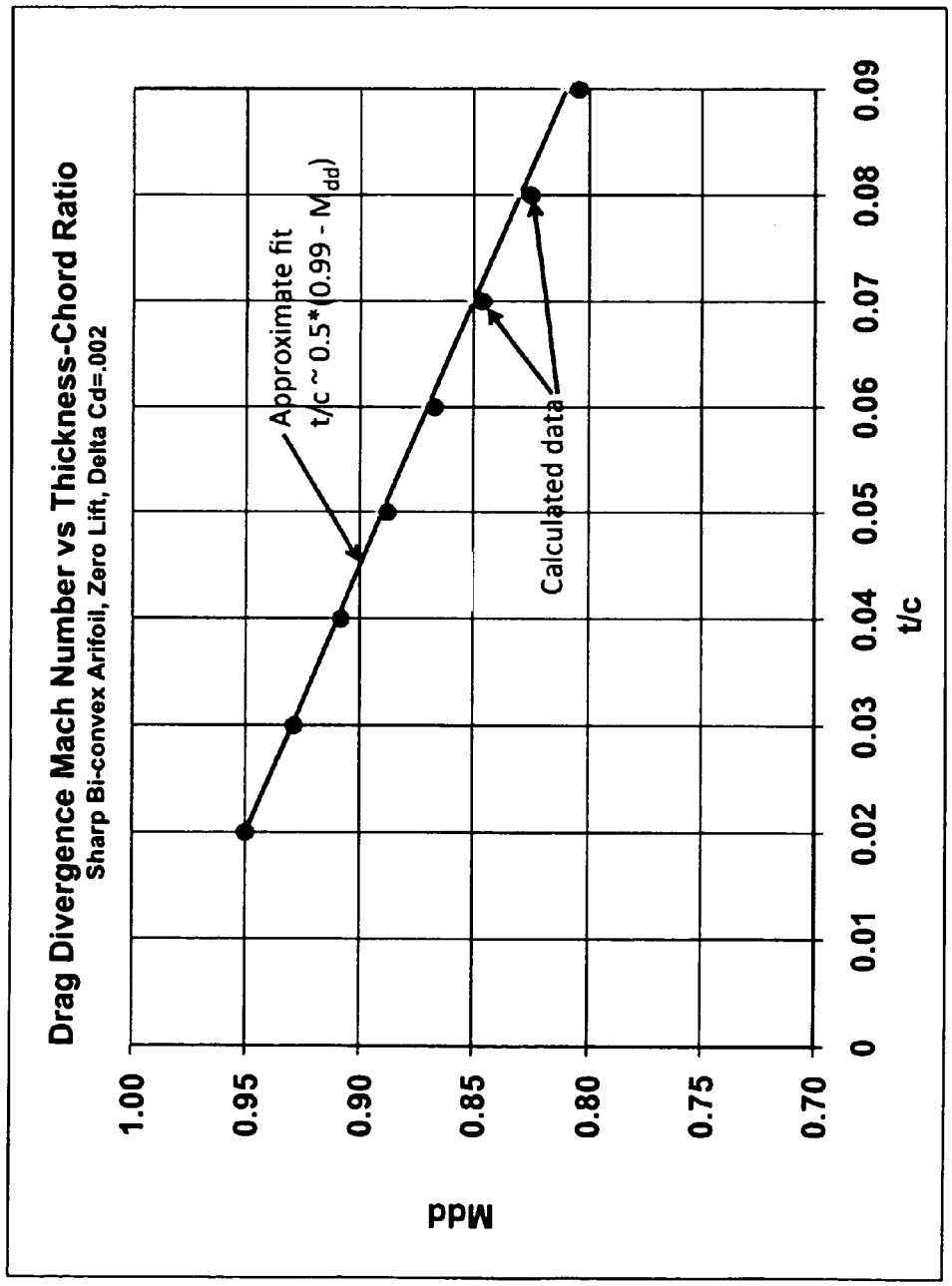
FIG. 4 is a graph showing a relationship between airfoil t/c and drag-rise Mach number.

FIG. 4 is a graph showing a representative relationship between airfoil t/c and the drag divergence Mach number (Mdd), for which the increase in drag coefficient is 0.002. The data is calculated using high order aerodynamic codes able to correctly represent conditions near Mach 1. The airfoils for this example are sharp-edged bi-convex sections at zero lift, and thus represent the lowest drag at a given Mach number and t/c. Airfoils with blunt leading edges, camber and angle of attack corresponding to a representative cruise lift coefficient will have a somewhat lower drag divergence Mach number, but the graph is illustrative of the relationship of Mdd to t/c.

Figure 5:
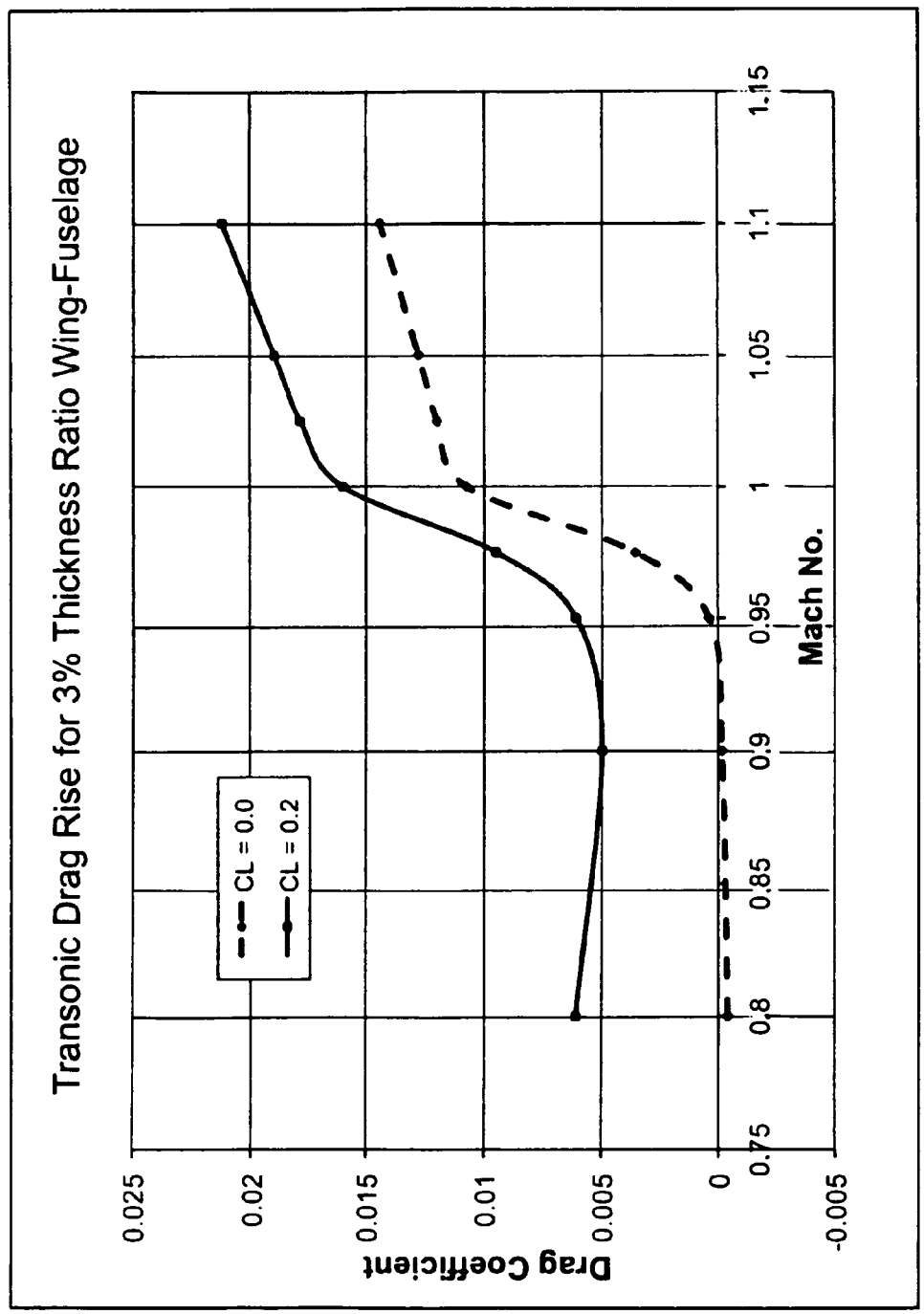
FIG. 5 is a graph showing the drag of a wing-fuselage configuration with 3% average wing t/c.

FIG. 5 illustrates the relatively low drag-rise at high subsonic Mach number of a wing-fuselage configuration with 3% average wing t/c, both at zero lift and at a lift coefficient of 0.3, typical of transonic cruise conditions. In both cases the drag divergence Mach number occurs at about Mach 0.96, much higher than achieved to applicants' knowledge with any current conventional swept wing subsonic aircraft.

Figure 6:
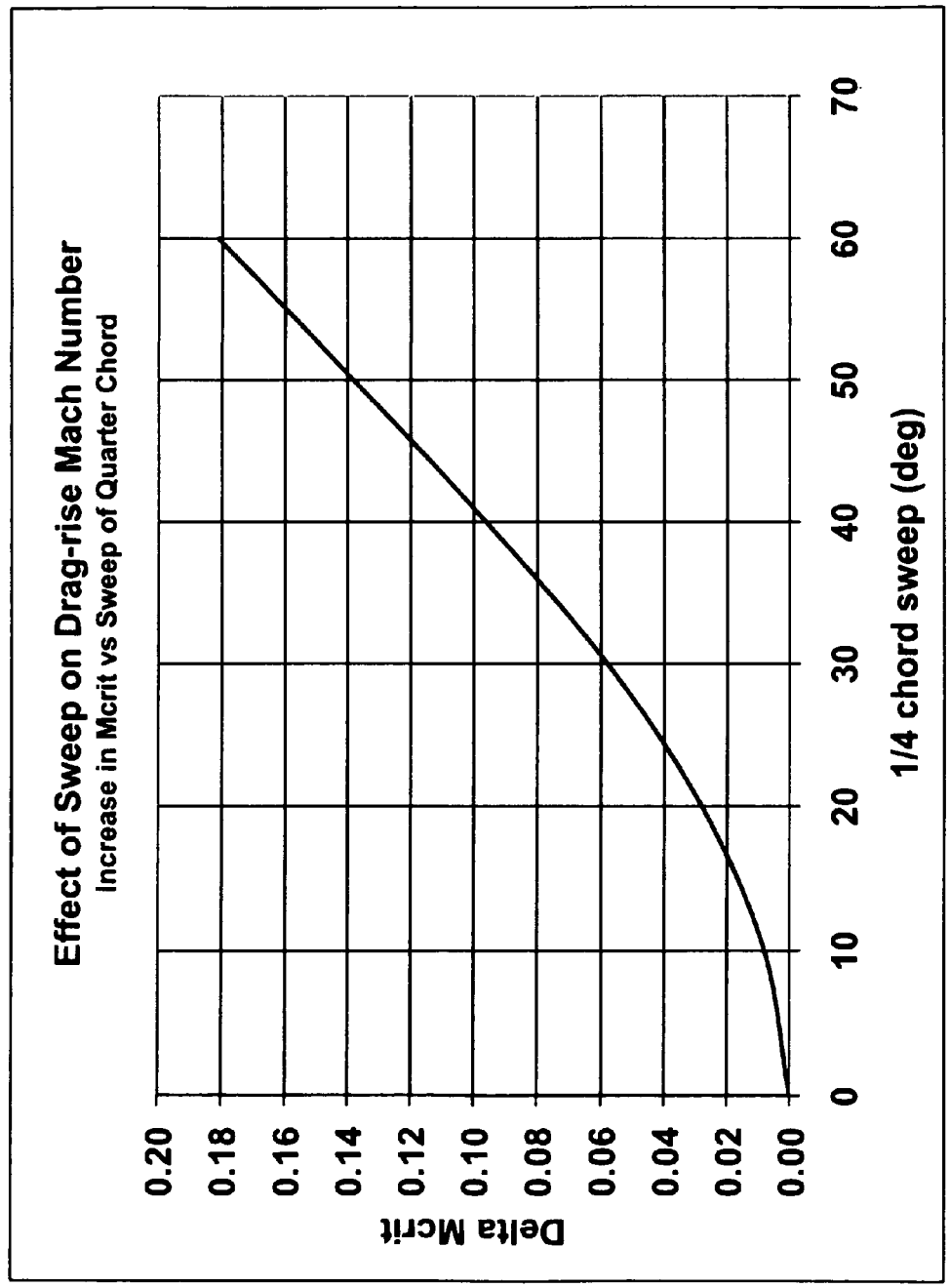
FIG. 6, is a graph of showing higher critical Mach number as a function of wing leading edge sweep.

FIG. 6 shows the approximate increase in critical Mach number (a widely used criterion for incipient drag rise with increasing Mach number) as a function of quarter-chord sweep for wings typical of those used in industry. This curve can be considered a first-order estimate of the role of leading edge sweep in increasing the low drag Mach number for a given t/c and airfoil. For example, the figure shows that a sweep angle of 30 degrees should increase Mdd by about 0.06. But from FIG. 3, an unswept wing with 3% t/c would have an Mdd of about 0.93, thus the 30 degree swept wing with 3% t/c would be expected to achieve efficient low drag flight at about Mach 0.99. This result would vary depending on details of the airfoil, wing span and integration with a fuselage, but is a much higher drag rise Mach number than can achieved to applicants' knowledge with any conventional 30 degree swept wing.

Figure 7:
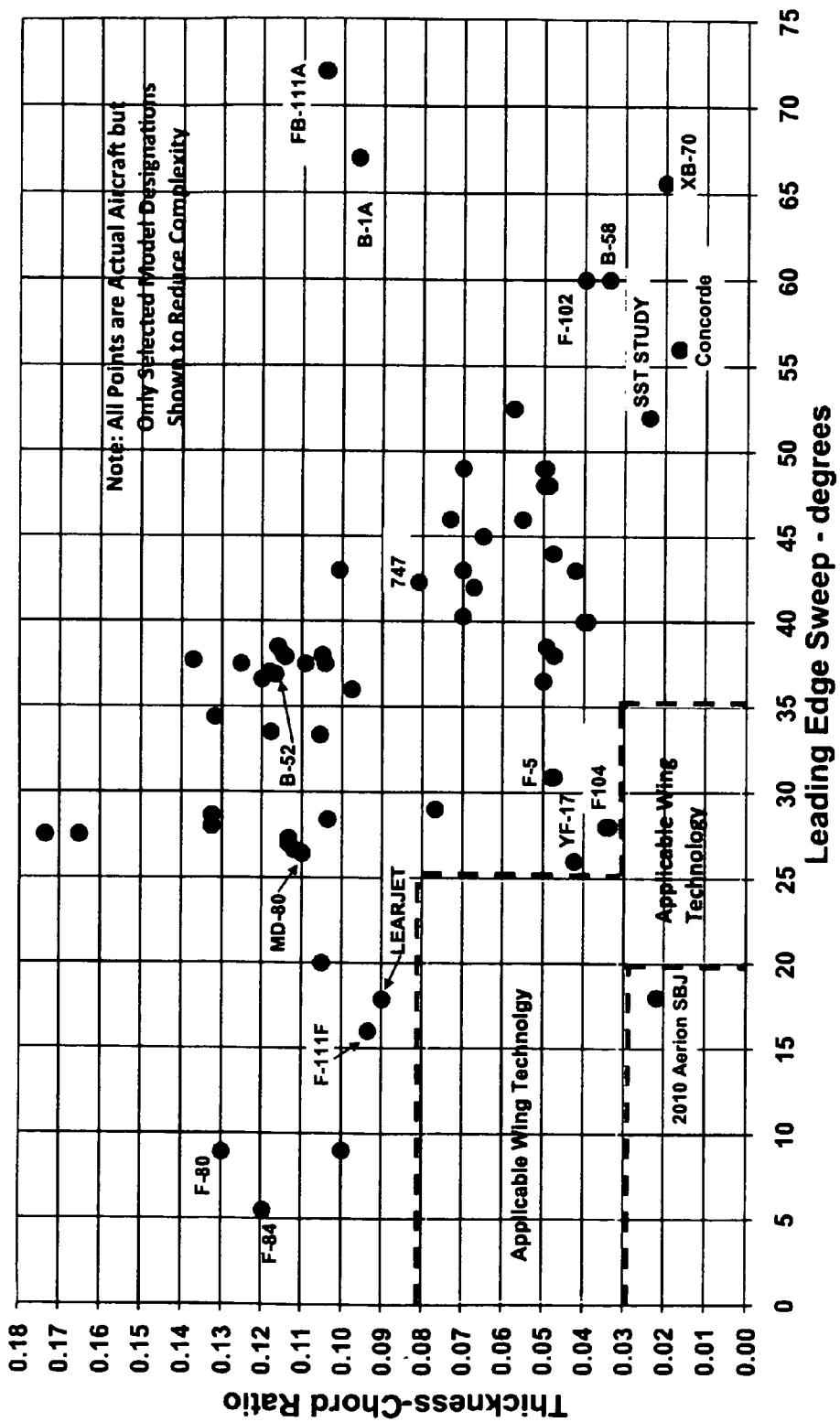
FIG. 7 is a chart showing the combination of wing sweep and t/c ratio for various representative aircraft.

FIG. 7 is a chart showing the combination of wing sweep and wing t/c ratio for all representative aircraft with maximum operating cruise speeds, Mmo, of more than Mach 0.80. Only selected points are identified as to the specific aircraft models to reduce clutter and emphasize known aircraft.

The chart shows that all aircraft with wing sweep angles below about 25 degrees, have thicker wings than the proposed 8% t/c upper limit. There are numerous subsonic aircraft such as jet transports and high end business jets designed for Mmo greater than Mach 0.80, but none having wing sweep less than 20 degrees and t/c below 8%. Also there are a few supersonic aircraft, mainly fighters, designed for Mmo up to Mach 2 or more, employing average t/c greater than about 0.03, but with wing sweep well above 20 degrees. Finally there are long-range supersonic cruise aircraft (or published designs) with average t/c less than 0.03 but all having leading edge sweep greater than about 50 degrees.

Thus, based on our comprehensive research, as FIG. 7 indicates, there are no aircraft that embody the proposed configuration combinations, namely (a) leading edge sweep less than about 25 degrees combined with average t/c between about 3% and 8%, and (b) leading edge sweep between about 20 and 35 degrees combined with average t/c less than about 0.03 (3%).

What is claimed is:

1. An aircraft having maximum efficient cruise speed in a range from about Mach 0.8 to about Mach 1.2, and having a fuselage and wings with:
   (a) less than about 25 degrees of leading edge sweep, in combination with airfoil thickness to chord ratios between about 3% and about 8%, as an average along a wing semi-span outboard from a zone of substantial fuselage influence, and
   (b) a wing leading edge sweep between about 20 degrees and about 35 degrees, in combination with airfoil thickness to chord ratios equal to or below about 3% as an average along the semi-span outboard from the zone of substantial fuselage influence to a wing tip.

2. The aircraft of claim 1 including fuselage lengthwise contours to minimize or reduce a wave drag of a combined wing and fuselage, including engine nacelles and empennage and other lifting and control surfaces.

3. The aircraft of claim 2 having fuselage and wing contours, including airfoil and sweep, to minimize or reduce total drag of the combined wing-fuselage, including effects of laminar flow in reducing skin friction drag.

4. The aircraft of claim 3 having empennage contours to minimize or reduce total drag of a combined wing, fuselage and empennage.

5. The aircraft of claim 4 having wing and empennage contours to maximize or increase a total range of the aircraft for a given maximum total takeoff weight or other related constraint, including the effects of thickness-to-chord ratio and sweep on a structural weight of the wings and empennage.

6. The aircraft of claim 4 having wing and empennage contours to minimize or decrease a total weight of the aircraft for a given mission or mix of missions, including effects of thickness-to-chord ratio and sweep on a structural weight of the wings and empennage.

7. The aircraft of claim 4 having wing and empennage contours to minimize or decrease a total weight of the aircraft for a given anticipated flight mission or mix of missions, including effects of thickness-to-chord ratio and sweep on a structural weight of the wings and empennage, where such wing and empennage contours are characterized by either (a) an iterative process combining configuration design experience, aerodynamic analysis and wind tunnel testing, or (b) a computer-based multi-disciplinary optimization method combined with configuration design constraints.

8. The aircraft of claim 1 wherein a drag rise Mach number lies between about 0.80 and 0.97.

9. The aircraft of claim 1 wherein a drag rise Mach number lies between about 0.97 and 1.2.

10. The aircraft of claim 1 wherein a drag rise Mach number lies between about 0.92 and 0.97, for a wing average t/c of about 3%.

11. The aircraft of claim 1 wherein a drag rise Mach number lies between about 0.95 and 1.15, for a wing average t/c of about 3%.

12. The aircraft of claim 1 having about 3% average wing t/c, characterized in that Mdd, corresponding to about 0.002 drag coefficient increase, occurs at about Mach 0.96.

13. The aircraft of claim 1 having about 3% average wing t/c, characterized in that wing leading edge sweep is between about 20 degrees and about 35 degrees, and by a supersonic drag rise Mach number between about 0.99 and 1.05.

14. The aircraft of claim 1 having wing leading edge sweep less than about 25 degrees, characterized in that wing average t/c is between about 3% and 8%.

15. The aircraft of claim 1 having wing leading edge sweep between about 20 degrees and 35 degrees, characterized in that wing average t/c is less than about 3%.

* * * * *